United States Patent [19]
Griffith

[11] Patent Number: 5,319,550
[45] Date of Patent: Jun. 7, 1994

[54] HIGH RESOLUTION DIGITAL IMAGE REGISTRATION

[75] Inventor: Lionell K. Griffith, Acton, Calif.

[73] Assignee: Olganix Corporation, Reseda, Calif.

[21] Appl. No.: 461,204

[22] Filed: Jan. 5, 1990

Related U.S. Application Data

[63] Continuation-in-part of Ser. No. 172,609, Mar. 24, 1988, Pat. No. 5,051,904.

[51] Int. Cl.$^5$ .................... G06F 15/42; G06F 15/62
[52] U.S. Cl. ...................... 364/413.19; 364/413.16; 382/52; 382/53; 382/61; 395/133; 395/138; 395/141; 348/135
[58] Field of Search ............. 364/413.19, 413.16; 382/52, 53, 61; 358/107; 395/133, 138, 141

[56] References Cited

U.S. PATENT DOCUMENTS

5,070,454 12/1991 Griffith ...................... 364/413.13
5,091,963 2/1992 Lih et al. ...................... 382/8

Primary Examiner—Roy N. Envall, Jr.
Assistant Examiner—Gita D. Shingala
Attorney, Agent, or Firm—Robbins, Berliner & Carson

[57] ABSTRACT

The center of a reference mark is located by decreasing the range of pixel values defining an image defect. The pixel values defining the digital image are then enhanced to amplify the pixel values representing the reference mark and decrease the pixel values representing the background. The center of the digital image of the reference mark is determined from the altered image.

8 Claims, 4 Drawing Sheets

| GRAPHIC DEPICTION | PIXEL VALUE |
|---|---|
|  | 0 |
|  | 15 |
|  | 20 |
|  | 120 |
|  | 140 |
|  | 150 |
|  | 160 |
|  | 170 |
|  | 189 |
|  | 206 |
|  | 223 |

HIGH RESOLUTION DIGITAL IMAGE REGISTRATION

This application is a continuation-in-part of U.S. patent application Ser. No. 172,609, filed Mar. 24, 1988 titled "COMPUTERIZED DYNAMIC TOMOGRAPHY SYSTEM" now U.S. Pat. No. 5,051,904, filed Sept. 24, 1991.

BACKGROUND AND SUMMARY OF THE INVENTION

The present invention relates to the fields of dynamic tomography and computed tomography. More particularly, its pertains to a method for high resolution digital image registration within a computerized dynamic tomography system.

Accurate and detailed visual information about the internal structure of an object is extremely valuable in a variety of applications. In the practice of medicine for example, visual examination of internal organs or bones is necessary to properly diagnose many ailments or to prepare for surgery. Non-invasive techniques, such as x-ray examination, often provide the only means of obtaining such visual information. As another example, quality control analysis of manufactured products requires inspection of internal parts.

Several techniques have been employed to obtain visual information about the internal structure of an object, without opening the object. Generally, penetrating radiation, such as x-rays or gamma rays, are directed at an object and the radiation which is transmitted through the object is recorded either on radiographic film or with electronic radiation detectors employing scintillation crystals. According to one known technique, "Computed Tomography" (CT), a radiation source is mounted in rotatable relation to a row of radiation detectors and an object is placed therebetween. The radiation source is then rotated to expose a section of the object to radiation from several angles and radiation measurements made by the radiation detectors are processed by a computer to generate a two-dimensional "slice", representative of the internal structure of the exposed section of the object.

This limitation of a single slice for each section of the object presents several problems if more than one slice is desired, as, for example, in generating a three-dimensional internal image of the object. First, the object must be moved discrete distances at discrete time intervals, corresponding to the "thickness" of each slice and the amount of time required to rotate the radiation source, thus requiring a complicated and expensive mechanical system to move the object in coordination with the rotating radiation source. Second, the object must be exposed to additional radiation for each additional slice, resulting in increased radiation dosage in proportion to the number of slices desired. Additionally, the amount of time required to complete the procedure is prolonged by each slice.

According to another known technique, "Dynamic Tomography", see, e.g., Richards, U.S. Pat. No. 4,167,672, a set of radiographs of an object is produced by exposing the object to radiation from a plurality of angles and recording each exposure on a separate piece of radiographic film. The set of radiographs can be superimposed in a stack for viewing, and by shifting alignment can produce a virtual focus of any image plane parallel to the plane of each film. This technique solves the single slice problem presented by computed tomography because the entire internal structure of the object can be displayed with a small number of radiographs. However, several other problems are presented. First, a complicated mechanical viewing system is required to achieve proper alignment while shifting the stack of radiographs. Second, the accuracy of alignment is restricted by the limitations of the physical components of a mechanical viewing system and the film itself. Third, image enhancement and manipulation are not possible with a stack of radiographs. Additionally, image planes non-parallel to the plane of each film cannot be adequately displayed by mechanical means.

A computerized dynamic tomography system, as described in U.S. patent application Ser. 172,609 now U.S. Pat. No. 5,051,904 can display any image plane or series of image planes of an object, for any desired angle, from a small number of radiographic images of the object. A radiation source exposes the object to penetrating radiation at a plurality of partial rotations of the object on a platform assembly. Reference marks are maintained in a constant position adjacent to a radiographic film to facilitate registration of the object. A separate radiographic film records the transmitted radiation at each partial rotation and each film is digitized by a digitizing camera. The digitized images are then supplied to a computer which registers each object image using the digitized reference mark image and with minimal assistance from a human operator.

The operator selects a level or series of levels desired for viewing and the computer displaces and selectively combines pixel values of the digitized images to produce selected images of the internal structure of the object. Interactive enhancement and manipulation of images is provided and compression of images is done to minimize the memory requirements of the invention.

The present invention provides an accurate method of locating the center of digital images by a computerized dynamic tomography system. Specifically, the present invention comprises a method for locating the center of a reference mark image within a high resolution digital image containing the reference mark image and image defects, represented by pixel values, in which: The pixel values defining an image defect are altered to reduce the range of pixel values representing the image defect; the pixel values defining the digital image are altered to reduce the range of pixel values representing the digital image; and a center of the resulting reference mark image is located.

In a preferred embodiment, the present invention is a method of enhancing the digital image of a reference mark and providing for accurate location of the center of a reference mark. Reference mark enhancement is a two step process requiring the removal of internal image defects contained within a reference mark image and enhancement of the pixel value contrast. The presence of internal defects and vague edges within a reference mark decreases the accuracy of known methods for locating the center of the mark. If the pixel value contrast is increased without removal of internal defects, some of the internal defects are enhanced rather than eliminated. If the center of a reference mark is located without enhancement of pixel values, accurate determination of the center of reference marks with poor edge quality is difficult. The present invention provides for accurate location of the center of reference marks with internal defects and vague edges by producing an image of a reference mark in which the interior is uniformly bright and the edge is sharp.

BRIEF DESCRIPTION OF THE DRAWINGS

The above and other features of the present invention may be more fully understood from the following detailed description, taken together with the accompanying drawing, wherein similar characters refer to similar elements throughout, similar graphics represent similar pixel values and in which.

DETAILED DESCRIPTION

Figure 1:
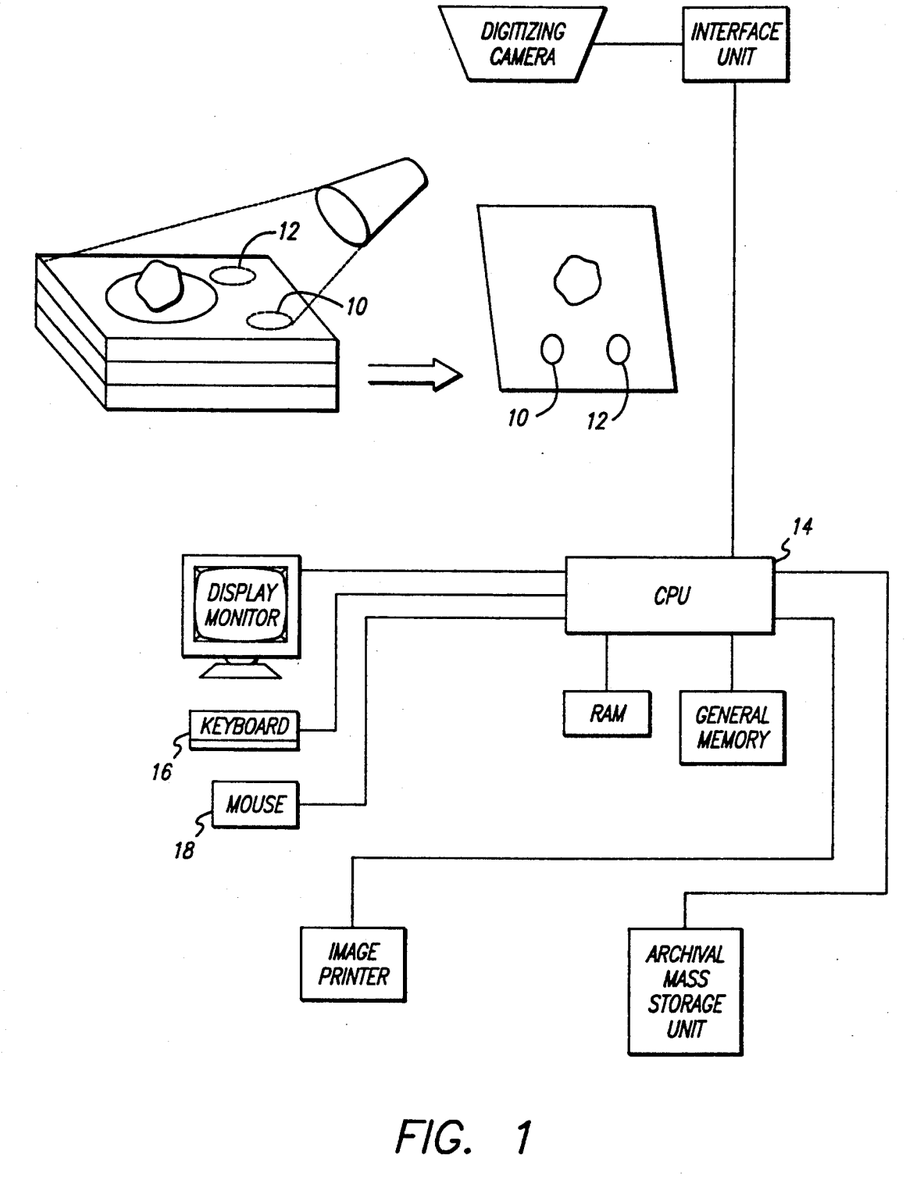
FIG. 1 is a schematic illustration of the apparatus utilized with the method of the present invention.

Referring to FIG. 1, there is shown an apparatus utilized by an exemplary embodiment of the present invention. An object to be examined is placed on a platform assembly comprising a rotation plate and a film cassette. The rotation plate is rotatable by known mechanical means to provide a plurality of partial rotations of the object. At each partial rotation, the object is exposed to penetrating radiation from a radiation source which is positioned on a support member (not shown) to cause the optical axis of the radiation source to intersect the center of the rotation plate at an angle between 45 and 90 degrees with respect to the plane of the rotation plate.

Two reference marks 10 and 12, circular discs made of a high-density substance, are mounted in the platform assembly between the rotation plate and the film cassette. The reference marks are positioned so that their centers constitute the base points of an equilateral triangle or otherwise known triangle, the apex point being the center of the rotation plate. A separate sheet of radiographic film is inserted into the film cassette prior to each partial rotation of the rotation plate and is removed subsequent to exposure from the radiation source so that each sheet of radiographic film records an entire radiographic image of the object in distinct angular orientation.

After being developed, each sheet of radiographic film is placed before a digitizing camera in perpendicular relationship to the optical axis of the digitizing camera nd positioned so that the long axis of the film is parallel to the long axis of the digitizing camera image. The distance between the digitizing camera lens and the film plane is uniformly maintained for each film and the focal plane of the digitizing camera is adjusted as closely as possible to the film. A selected area of each film, containing the shadow images of the object and the reference marks 10 and 12 in the center of the selected area, is digitized. That is, electronic signals are supplied to a computer 14 through an interface unit. The signals supplied by the digitizing camera comprise binary signals representative of an intensity value, on a 0 to 255 level gray scale, for each pixel of the selected area on each film. The pixel values are stored in random access memory (RAM) or general memory in a separate two-dimensional byte array for each digitized film image, where a first dimension corresponds to the x-coordinate axis and a second dimension corresponds to the y-coordinate axis of the digitized image.

Because the dimensions of each film cannot be adequately reproduced for successive films and a rigid relationship among the radiation source, the film and the digitizing camera cannot be maintained, errors of rotation and displacement are present in each digitized image. To correct such errors, each digitized image must be registered utilizing information contained on the image. Registration requires accurate knowledge of the location of the center of the reference marks and a computation of the angle of error of each digitized image. The accuracy of locating the center of a reference mark is diminished by the presence of internal image defects and vague edges within the digitized image.

Generally, circular manufactured lead disks are used as reference marks. The circular disks have a thickness which results in an oval reference mark image when the reference mark is angularly exposed to radiation and the resulting film is digitized. The center of the digitized oval reference mark image is determined by the mean coordinates of the long and narrow axes of the oval image.

To locate the center of the reference marks, each digitized image is displayed on a display monitor and a human operator utilizes a keyboard 16 or a mouse device 18 to designate a digital image 20 containing a reference mark. Generally, a graphics tool, such as a rubber band box, may be used to designate a digital image 20 containing a reference mark. Then, the pixel values representing the reference mark and the background of the reference mark image (those defined by the rotation plate image) are enhanced. Enhancing a digital image containing a reference mark is a two step method.

First, in response to an operator input, the computer removes internal image defects in the reference mark image. Image defects are the result of varying intensities or impurities in the high density substance used to make a circular disk used as a reference mark. A digitized image of a reference mark defect contains pixels with intensity values below the minimum intensity value for a reference mark.

Second, also in response to an operator input, the computer enhances the contrast between the pixel values representing the reference mark and the background. Enhancement of the pixel values increases the accuracy of the determination of the location of the center of the reference mark. If the contrast of the pixels forming the reference mark were enhanced without removal of image defects, some of the image defects would be enhanced rather than eliminated. Thus, it is necessary to provide a method for removing image defects within the reference mark image.

Figure 2:
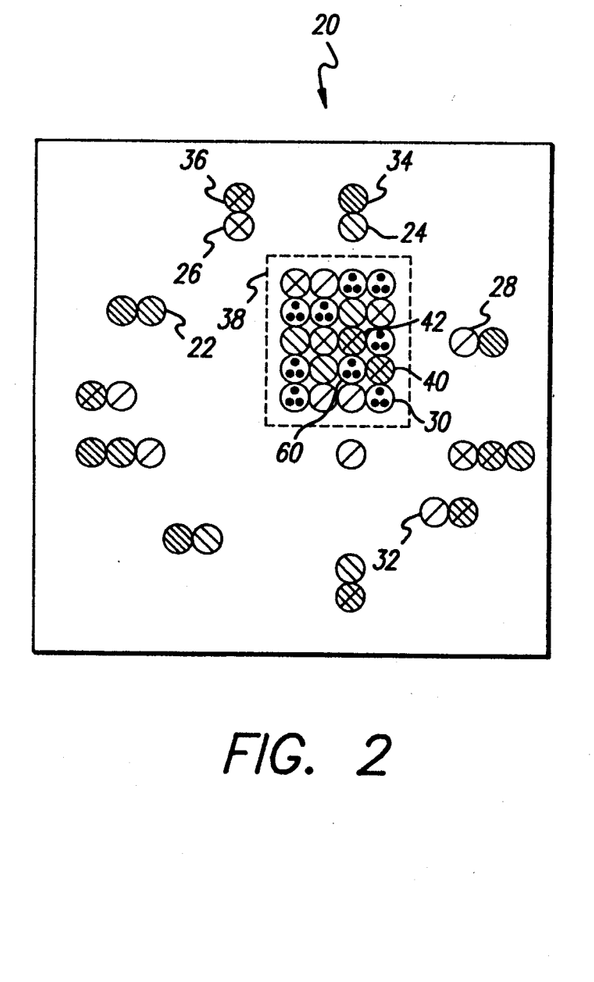
FIG. 2 is graphic illustration of a digitized film image.

FIG. 2 is an exploded graphical representation of the digital image 20. The digital image 20 is the digitized reproduction of a radiographic image of a reference mark placed on a platform assembly. In FIGS. 2 through 5, pixels with an intensity value, or pixel value, over 119 on the gray scale represent the reference mark. Conversely, pixels with a pixel value less than 120 on the gray scale represent the rotation plate.

Figure 6:
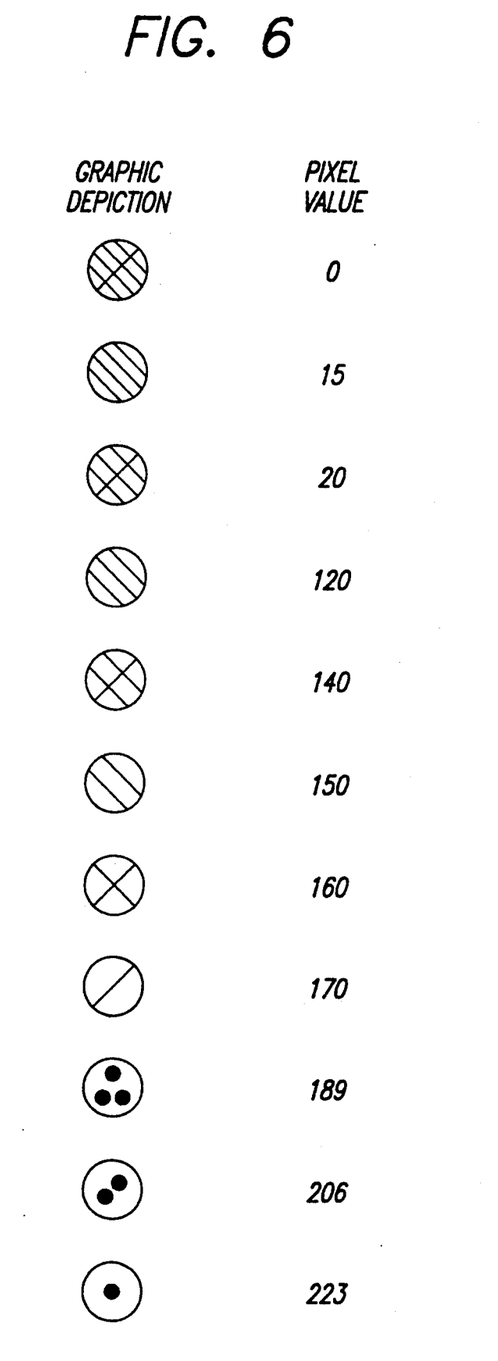
FIG. 6 is a chart of the pixel values graphically depicted in FIGS. 2 through 5.

Pixels 22, 24, 26, 28 and 30 represent the reference mark. The pixels 22, 24 and 26 have intensity values of 120, 150 and 160, respectively, on the gray scale. The pixels 28 and 30 have intensity values of 170 and 189, respectively. Pixels with graphics similar to the graphics of the pixels 22, 24, 26, 28 and 30 have intensity values equal to pixels with corresponding graphics. (FIG. 6). Thus, a pixel 32 with a graphic representation corresponding to the graphics representation of the pixel 28, has an intensity value of 170.

In FIGS. 2 through 5, the background is represented by pixels with an intensity value less than 120 on the gray scale. Pixels 34 and 36 represent the background. The pixel 34 has an intensity value of 15, while the pixel 36 has an intensity value of 20.

The digital image 20 contains an internal image defect 38. The image defect 38 contains pixels 40 and 42, each having an intensity value of 20. This pixel value is below 120 on the gray scale, the minimum intensity value of a pixel representing the reference mark. As will be shown later, when locating the center of a reference mark it is vital that all pixels representing the reference mark have intensity values that are above the minimum reference mark intensity value. Thus, the internal image defect must be removed from the digital image.

Figure 3:
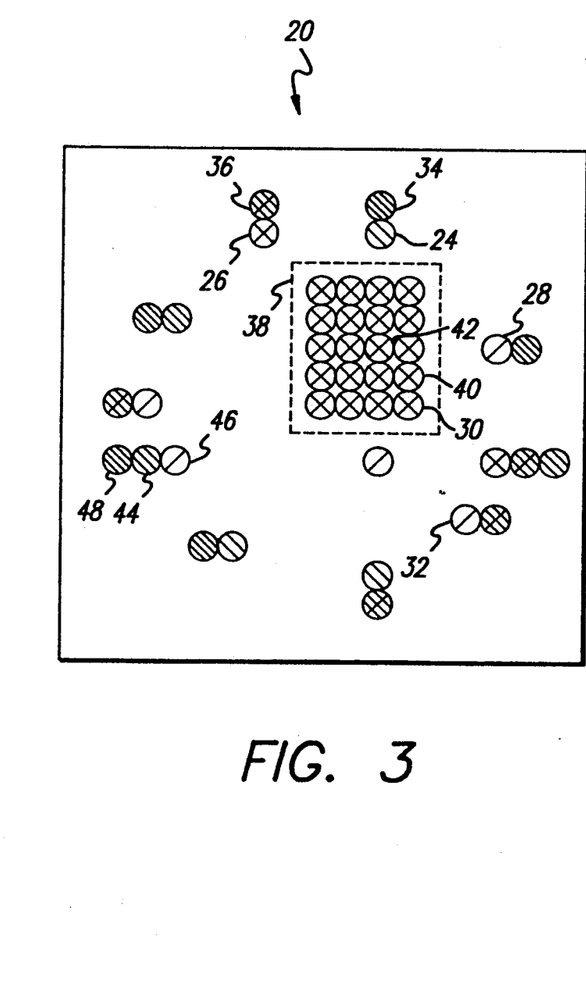
FIG. 3 is a graphic illustration of altering the pixel values defining an image defect.

FIG. 3 is a graphic illustration of the pixels representing the digital image 20 after the internal image defect is removed by altering the pixel values to reduce the range of pixel values representing the image defect 38. The human operator utilizes the keyboard 16 or the mouse device 18 (FIG. 1) to designate the pixels representing the image defect 38. The computer 14 then computes the mean intensity value of the selected pixels. Next, the image defect pixel values are replaced with the mean intensity value. Thus, the pixels 30, 40, 42 and all other pixels representing the image defect 38 are assigned the same intensity value. The mean intensity value of the pixels comprising the image defect 38 of FIG. 2 is equal to 160 on the gray scale. Thus, all of the pixels comprising the image defect in FIG. 3 have the same intensity value after removal of the image defect.

Figure 4:
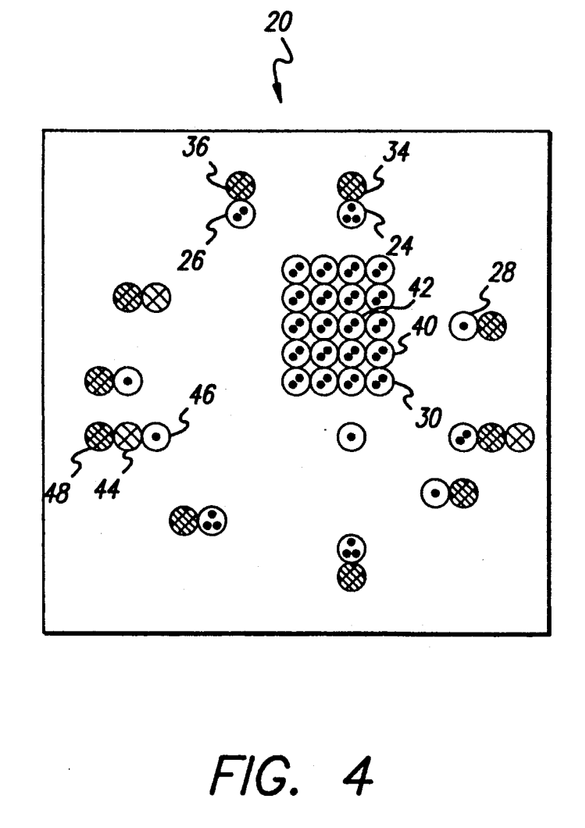
FIG. 4 is a graphic illustration of enhancing the pixel values defining an edge.

In FIG. 4, the intensity values of the pixels comprising the digital image 20 are enhanced to create a uniformly bright interior and sharp reference mark edges. The reference mark is enhanced when the differential of the pixel values of the reference mark and the background is increased. In FIG. 3, a pixel 44 has an intensity value of 120 on the gray scale. A pixel 46 located to the right of the pixel 44 has an intensity value of 170. A pixel 48 located to the left of the pixel 44 has an intensity value of 20. Thus, it is likely that the true edge of the referenced mark lies on a subpixel level of the pixel 44. Enhancing the pixel values by increasing the intensities of pixels which are likely to represent the reference mark and decreasing the intensities of pixels that are likely to represent the background will create an edge defined at the whole pixel level and thus, a sharper edge.

Figure 5:
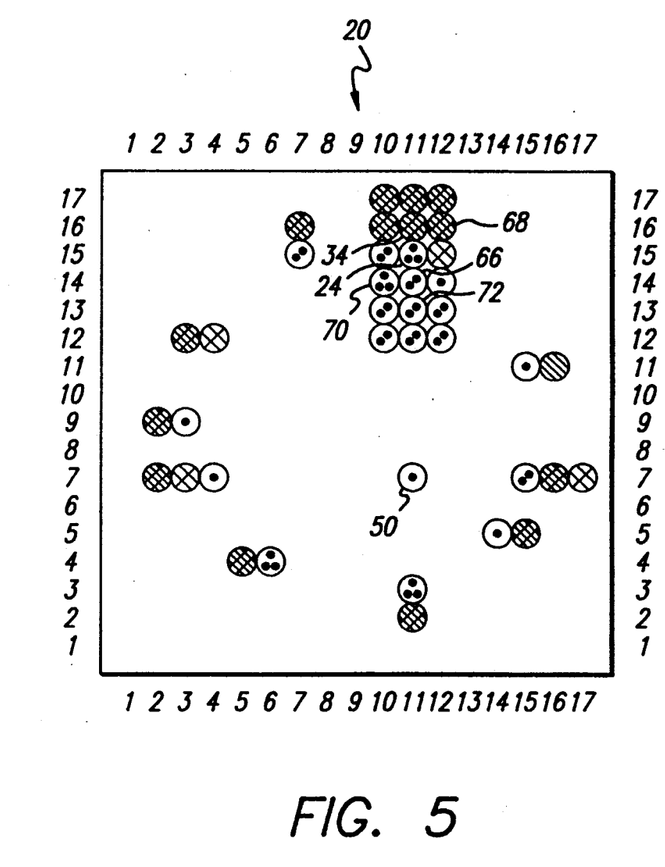
FIG. 5 is a graphic illustration of locating the center of the resulting digital image.

The result of enhancing the digital image pixel values is that the center of the reference mark may be accurately located, as illustrated in FIG. 5. For example, to enhance the pixel values shown in FIG. 3, new intensity values are assigned to each of the pixels. Accordingly, each pixel is selected in turn and a new intensity value is determined according to the following formulas:

$$\text{ref\_\&\_back\_difference} = \text{high\_ref\_p\_v} - \text{high\_back\_p\_v}$$

$$\text{max\_back\_p\_v} = (P1 * \text{ref\_\&\_back\_difference}) + \text{high\_back\_p\_v}$$

$$\text{modified\_ref\_p\_v} = \text{high\_ref\_p\_v} - (P2 * \text{ref\_\&\_back\_difference})$$

$$\text{enhanced\_p\_v} = (\text{old\_p\_v} - \text{max\_back\_p\_v}) * (\text{max\_p\_v} / \text{modified\_ref\_p\_v})$$

Where the high_ref_p_v is the maximum reference mark pixel value. The highest pixel value within the periphery of the digital image 20 determines the pixel values of the background for the reference mark, the high_back_p_v. P1 is a preselected percentage, P2 is a preselected percentage, old_p_v is the original pixel value of the selected pixel, max_p_v is the maximum possible pixel value and enhanced_p_v is the enhanced pixel value.

The enhanced pixel value is then compared for highs and lows on the gray scale. As stated above, the gray scale is generally defined between 0 and 255. If necessary, the enhanced_p_v is modified according to the following formulas:

If enhanced_p_v < 0 then enhanced_p_v = 0
If enhanced_p_v > max_p_v, then enhanced_p_v = max_p_v The selected pixel value is then assigned the enhanced p_v.

Referring to FIG. 3, the following formulas are used to determine the new pixel value of the pixel 44, with an original gray scale intensity of 120:

high_ref_p_v = 170 (defined by the pixel 28)
high_back_p_v = 0 (defined by the pixel 36)
P1 = 10% (preselected)
P2 = 10% (preselected)
old_p_v = 120
max_p_v = 255 (predefined)
ref_&_back_difference = 170 − 20 = 150
max_back_p_v = (0.10*150) + 20 = 35  20 = 35
modified_ref_p_v = 170 − (0.10*150) = 155
enhanced_p_v = (120 − 35)*(255/155) = 140

The enhanced_p_v is neither less than 0 nor greater than 255, thus, an enhanced pixel value of 140 on the gray scale is assigned to the pixel 44. This determination is made for each pixel comprising the digital image 20.

After removal of all internal image defects and pixel value enhancement, the computer 14 ascertains the approximate center of each reference mark 10 and 12 by determining the maximum first differential of pixel intensity along the x axis and the y axis radiating from a reference pixel chosen within the reference mark. That computation is accomplished by finding the distance weighted mean of the absolute values of the differences of intensity values between immediately bounding pixels for each pixel radiating for a reference pixel within the reference mark image. Points lying on the edge of each reference mark 10 and 12 are located by finding the x and y coordinate values of the maximum of slope values along the x and y axes for each side of the reference pixel. The coordinates for the centers of the reference marks are determined by computing the mean x edge coordinate value and the mean y edge coordinate value for each reference mark.

FIG. 5 is a graphic illustration of the method of locating the center of the reference mark. The center of a reference mark is determined by its edges. Initially, a pixel within the reference mark is selected as a reference pixel. An edge is defined as the maximum first differential of pixel intensities, the "slope", of pixels radiating from the reference pixel. The slope for each radiating pixel is determined by the distance weighted sum of the absolute values of the differences of intensity values between immediately bounding pixels divided by the sum of the distances. Each radiating pixel has four juxtaposed pixels slopes. A juxtaposed pixels slope is determined by the absolute value of the difference of juxtaposed bounding pixel values multiplied by the distance between the same pixels. The slope for each radiating pixel is determined by the sum of the four juxtaposed pixel slopes divided by the sum of the distances between juxtaposed pixels. This calculation results in a direction independent estimation of the pixel value slope. Thus, the slope for a pixel is determined by its immediately bounding pixels, not simply the intensity change along one axis.

Once the slope is determined for each radiating pixel, three pixel slopes will define the peak of the slopes. Generally, one pixel slope will define the maximum slope of the radiating pixels and two slopes will bound the maximum. These three pixels are used in a second order curve fit to determine the general equation of the parabola passing between the three points. The maximum of the resulting equation defines the edge.

The determination of one edge, the upper edge, is illustrated in FIG. 5. First, a pixel within the reference mark is selected as the reference pixel. Next, upper edge pixel coordinate values are determined by the location of the maximum of pixel slopes along the reference pixel x-axis with y coordinates greater than the reference pixel y coordinate.

In addition to the determination of an upper edge pixel, to locate the center of the reference mark a lower edge pixel, a right edge pixel and a left edge pixel must be determined. Each edge pixel is ascertained in the same manner as the upper edge pixel. Once the edge pixels are determined, the y coordinates of the upper edge pixel and the lower edge pixel are averaged to determine the y coordinate of the center of the reference mark. The x coordinates of the right edge pixel and the left edge pixel are averaged to determine the x coordinate of the center of the reference mark.

FIG. 5 shows the pixels comprising the digital image 20 on a coordinate axis system. A pixel 50 is selected as the reference pixel. The reference pixel's coordinates are (11,7). Thus, the upper edge pixel will have an x coordinate of 11 and a y coordinate greater than or equal to 7.

The upper edge pixel is the location of the pixel with the maximum of slope values of pixels radiating from the reference pixel along the reference pixel x-axis with y coordinates greater than the reference pixel y coordinate. A computation of the slope values of the pixel 24, a pixel radiating from the reference pixel is as follows:

Four juxtaposed pixels slopes are determined by the absolute value of the difference of juxtaposed bounding pixel values multiplied by the distance between the same pixels. Thus, a first juxtaposed pixels slope is calculated by the absolute value of the difference between the pixel values of juxtaposed bounding pixels, the pixel 34 and a pixel 66 multiplied by the distance between the pixel 34 and the pixel 66. The intensity value for the pixel 34 is equal to 0, while the intensity value for the pixel 66 is 206. The absolute value of the difference between their intensities is equal to 206. The distance between the pixel 34 and the pixel 66 is equal to 2.

Therefore, the first juxtaposed pixels slope for the pixel 24 is equal to 103.

A second juxtaposed pixels slope for the pixel 24 may be calculated with pixels 68 and 70. The absolute value of the difference between the intensities of the pixel 68 and 70 is equal to 189. The distance between the pixel 34 and the pixel 66 is equal to 2 * square root of 2. Therefore, the second juxtaposed pixels slope for the pixel 24 is equal to 189 divided by 2 * square root of 2.

To determine the slope of the pixel 24, a third and a fourth juxtaposed pixels slope are calculated using the remaining pixels bounding the pixel 24. The slope is determined by the sum of the four juxtaposed pixels slopes divided by the sum of the distances between juxtaposed pixels.

A calculation of the slopes for a pixel 72 and the pixels 66, 24 and 34 results in slopes of 1.79, 7.15, 41.24 and 31.75, respectively. A comparison of these slope values reveals a peak at the pixel 24 slope, with the slopes of the pixels 34 and 66 bounding the peak. The y coordinate and the slope of these three pixels are used in a second order curve fit to determine the general equation of the parabola passing between the three pixels. The maximum of the resulting parabola defines the y coordinate of the edge. The x coordinate of the edge is the same as the reference pixel x coordinate, 11.

The same method is used to calculate the coordinates of a lower edge pixel, a right edge pixel and a left edge pixel must be determined. Then the y coordinates of the upper edge pixel and the lower edge pixel are averaged to determine the y coordinate of the center of the reference mark. The x coordinates of the right edge pixel and the left edge pixel are averaged to determine the x coordinate of the center of the reference mark.

Following the determination of the location of the center of each reference mark, the angle of error of rotation of each digitized image and the error of the center of rotation are determined according to methods described by Griffith in patent Ser. No. 172,609, requiring knowledge of the coordinate values of the center of the reference marks 10 and 12. The error in the angle of rotation and the error in the center of rotation are used to adjust the registration of each digitized image to standard rotation according to another method described by Griffith for image translation and rotation. The result is a new set of coordinates for each pixel.

The accuracy of locating the center of a reference mark is significantly improved by iterations of the locating method. Successive iterations of the method to locate the reference mark center and the image translation and rotation methods significantly improve the image registration. Two iterations of each method may provide registration to approximately one-fourth of a pixel. In general, further iterations of the methods produce no useful improvement.

After each of the digitized images is registered, it is stored in general memory. The operator may recall an image for interactive enhancement by specifying with the keyboard 16 or mouse device 18 any of the following functions: contrast enhancement, profile wedge correction, selection of area of interest, histogram correction, edge enhancement and false color. Known image processing techniques are used for these functions and are not described in detail herein.

Referring again to FIG. 1, an image may be selected and displayed on the display monitor allowing the operator to interactively enhance the displayed image. The operator can also have the image printed on a image printer, or stored in general memory or in a archival mass storage unit.

Although described for purposes of clarity with regard to specific preferred methods, the present invention is not limited to those embodiments but rather is applicable broadly to all methods falling within the scope and spirit of the appended claims.

I claim:

1. A method for locating the center of a reference mark image, containing image defects, within a high resolution digital image, defined by pixel intensity values, stored in computer memory locations, comprising:
   altering the pixel intensity values of those computer memory locations that represent an image defect whereby to reduce the range of pixel intensity values representing the image defect;
   altering the pixel intensity values of all the digital image computer memory locations with an arbitrarily bounded portion of the background area larger than and wholly containing the reference mark image whereby to expand the range of pixel intensity values representing the image of the reference mark image; and
   utilizing the pixel intensity values of the reference mark computer memory locations to compute the center of the resulting reference mark image.

2. The method of claim 1 wherein the step of altering the intensity values of the image defect computer memory locations further comprises:
   determining a mean pixel intensity value of computer memory locations representing an arbitrarily bounded image area wholly containing the image defect and wholly within the reference mark image; and
   altering the computer memory locations representing the bounded area to replace the pixel intensity values with the mean pixel intensity value.

3. The method of claim 2 wherein the step of altering the intensity values of all of the digital image computer memory locations within said arbitrarily bounded area further comprises:
   determining the maximum pixel intensity value of the image pixels on or immediately adjacent to the arbitrary bound as a first maximum pixel intensity value;
   determining the maximum pixel intensity value of the area within the arbitrary bound including the reference mark image as a second maximum pixel intensity value;
   determining the difference between the first and second determined maximum pixel intensity value;
   adding a predetermined fraction of the difference to the first determined maximum pixel value to compute a low pixel value; and
   subtracting a predetermined fraction of the difference from the second determined maximum pixel value to compute a high pixel value; and
   altering the digital image computer memory locations representing said arbitrarily bounded image area whereby to expend the range of the reference mark image edge pixels.

4. The method of claim 3, wherein the expanding step comprises:
   determining a linear expansion equation based upon the high and low computed pixel values and the pixel values representing maximum possible and minimum possible image pixel values; and
   altering the digital image by applying said linear expansion equation to each image pixel within said arbitrarily bounded image area whereby to expand linearly the range of all image pixels between the high and low pixel values to the maximum and minimum possible image pixel values and whereby all pixel values above or below the high and low pixel values will be limited to the maximum and minimum possible image pixel values.

5. The method of claim 1, wherein the method of computing the center further comprises:
   determining an arbitrary pixel within the reference mark image, thereby defining a reference pixel;
   determining the locations of the maximum first differential of pixel values along the x-axis and the y-axis radiating from the reference pixel;
   determining the mean x coordinate of the maximum first differentials of pixel values along the x-axis radiating from the reference pixel whereby the x coordinate of the center of the reference mark image is defined;
   determining the mean y coordinate of the maximum first differentials of pixel values along the y-axis radiating from the reference pixel whereby the y coordinate of the center of the reference mark image is defined; and
   multiply utilizing the center thus found to determine a refined reference pixel, closer to the true center, wherein a refinement of the center can be computed in a manner similar to the first determination.

6. The method of claim 5, wherein the method of computing the coordinate of the maximum first differential of pixel values further comprises:
   for a given pixel along either the x-axis or y-axis radiating from the reference pixel;
   using the pixel values from the eight nearest pixels to that given pixel;
   computing the absolute difference in pixel values between the four pairs of pixels on opposing sides of the given pixel;
   dividing the result of each by a number proportional to the distance between the pixels of each pair with two being the preferred value for the x and y axis pairs and the square root of eight being the preferred value for the two diagonal pairs;
   computing the differential of the given pixel value by summing the resulting values and dividing their sum by four; and
   using a succession of such pixel value differentials radiating from the reference pixel, determine the coordinate of the maximum first differential of pixel value.

7. The method of claim 6, wherein the method of computing the coordinate of the maximum first differential of pixel value further comprises;
   computing the next first differential of pixel value with the preceding first differential of pixel value radiating out from the reference pixel until the next first differential of pixel value is less than the preceding first differential of pixel value by a predetermined amount;
   using that first differential of pixel value and the two preceding first differential of pixel values and identifying them as value1, value2, value3 as they radiate outward from the reference pixel, determining the offset of the maximum first differential of pixel value from the coordinate of the pixel giving the first differential of pixel value labeled value2; and computing the coordinate of the maximum first differential of pixel value by adding the offset thus determined to the coordinate of the pixel giving the first differential of pixel value labeled value2.

8. The method of claim 7, wherein the method of computing the offset of the maximum first differential of pixel value further comprises:

using value1, value2, and value3 to compute a coefficient, to be identified as coefficient1, by adding value1 to value2 then dividing the result of the summation by two and then by subtracting value2 from the result of the division;

further computing a coefficient, to be identified as coefficient2, by adding value2 and coefficient1 and then by subtracting value1 from the result of the summation;

whereby if coefficient1 is not equal to zero, the offset of the maximum first differential of pixel value is computed as the negative of coefficient2 divided by the quantity two times coefficient1; and whereby if coefficient1 is equal to zero, then the offset of the maximum first differential of pixel value is zero.

* * * * *